US010039419B2

(12) United States Patent
Gushwa et al.

(10) Patent No.: US 10,039,419 B2
(45) Date of Patent: Aug. 7, 2018

(54) CONTAINER AND SYSTEM FOR HOLDING A CUTTING TOOL OF A FOOD PROCESSING DEVICE

(75) Inventors: David J. Gushwa, Mishawaka, IN (US); Euan Skinner MacLeod, New Territories (HK); Edith M. Wine, Pittsburgh, PA (US)

(73) Assignee: Whirlpool Corporation, Benton Harbor, MI (US)

( * ) Notice: Subject to any disclaimer, the term of this patent is extended or adjusted under 35 U.S.C. 154(b) by 729 days.

(21) Appl. No.: 14/382,770

(22) PCT Filed: Mar. 9, 2012

(86) PCT No.: PCT/CN2012/000300
§ 371 (c)(1),
(2), (4) Date: Sep. 4, 2014

(87) PCT Pub. No.: WO2013/131210
PCT Pub. Date: Sep. 12, 2013

(65) Prior Publication Data
US 2015/0164280 A1    Jun. 18, 2015

(51) Int. Cl.
*A47J 43/07* (2006.01)
*B65D 25/10* (2006.01)
(Continued)

(52) U.S. Cl.
CPC .......... *A47J 43/0716* (2013.01); *B65D 25/10* (2013.01); *B65D 43/14* (2013.01); *B65D 55/02* (2013.01);
(Continued)

(58) Field of Classification Search
CPC .. B23D 59/00; B23D 61/025; B65D 83/0454; B65D 85/02; B65D 85/58; A47G 23/08; B27B 5/29
(Continued)

(56) References Cited

U.S. PATENT DOCUMENTS 1,497,199 A * 6/1924 Sutthoff ................. A47G 19/16
                                                              206/0.5
2,555,594 A    6/1951 Markovitz
(Continued)

FOREIGN PATENT DOCUMENTS

CN    101073477 A    11/2007
CN    101385616 A    3/2009
(Continued)

OTHER PUBLICATIONS

International Patent Application No. PCT/CN2012000300 dated Mar. 9, 2012, Applicant: Whirlpool Corporation, entitled "Container and System for Holding a Cutting Tool of a Food Processing Device"; PCT Publication No. WO2013/131210A1, publication date: Sep. 12, 2013 re same.
(Continued)

*Primary Examiner* — Chun Cheung
*Assistant Examiner* — Brijesh V. Patel
(74) *Attorney, Agent, or Firm* — Price Heneveld LLP

(57) ABSTRACT

A container and system for holding a cutting tool of a food processing device is disclosed. The container includes a shell defining a chamber sized to receive one of at least a first cutting tool and a second cutting tool. The shell has a slot that receives a stem of the first cutting tool when the first cutting tool is positioned in the chamber and another slot that receives a stem of the second cutting tool when the second cutting tool is positioned in the chamber. The shell also has a plurality of openings that are sized to permit fluid to pass into the chamber.

18 Claims, 7 Drawing Sheets

(51) Int. Cl.
  *B65D 43/14* (2006.01)
  *B65D 55/02* (2006.01)
  *B65D 85/00* (2006.01)

(52) U.S. Cl.
  CPC ....... B65D 85/70 (2013.01); *A47J 2043/0738* (2013.01)

(58) Field of Classification Search
  USPC .................. 206/303, 308.1, 308.3, 309, 349, 206/372–373, 445, 538, 553, 806; 220/4.22, 4.26–4.27, 8, 345.4, 507, 841; D3/315, 905; D15/133
  See application file for complete search history.

(56) References Cited

U.S. PATENT DOCUMENTS

| | | | | |
|---|---|---|---|---|
| 3,156,349 A * | 11/1964 | Brown | ................... | B65D 59/00 206/349 |
| 3,392,868 A * | 7/1968 | Pfrommer | .............. | A45D 33/22 220/4.27 |
| 3,429,629 A * | 2/1969 | Cilia | ................... | B42F 15/0005 206/309 |
| 4,135,868 A * | 1/1979 | Schainholz | ............... | A61L 2/26 206/438 |
| 4,146,131 A | 3/1979 | Hoffman et al. | | |
| 4,560,078 A * | 12/1985 | Dubuisson | ............. | A45D 33/00 206/503 |
| 4,611,713 A * | 9/1986 | Byrns | ................ | B23D 57/0092 206/303 |
| 4,733,827 A * | 3/1988 | Williams | ................ | A47J 43/07 206/373 |
| 4,811,998 A * | 3/1989 | Rankin | .................. | B25H 3/006 206/303 |
| 5,084,251 A * | 1/1992 | Thomas | ................. | A61C 19/02 206/557 |
| 5,833,075 A | 11/1998 | Czaplinski et al. | | |
| 5,836,392 A | 11/1998 | Urlwin-Smith | | |
| 6,186,349 B1 * | 2/2001 | Tempongko | ........... | B65D 11/02 206/309 |
| 6,338,408 B1 * | 1/2002 | Anderson | ............... | A61J 1/035 206/1.5 |
| 6,401,922 B1 * | 6/2002 | Svetlik | ................... | B23D 59/00 206/373 |
| 6,729,468 B1 * | 5/2004 | Dobmeier | ............. | B23D 59/00 206/303 |
| 7,197,904 B2 * | 4/2007 | Marcelle | ................. | F16K 35/10 70/164 |
| 7,370,758 B2 * | 5/2008 | Smith | .................... | B23D 59/00 206/349 |
| 7,752,876 B2 * | 7/2010 | Meekma | ................. | F16K 35/10 70/164 |
| D635,303 S * | 3/2011 | Chung | .......................... | D28/83 |
| 8,056,720 B2 * | 11/2011 | Hawkes | ................... | A61L 2/26 206/363 |
| 2003/0029748 A1 * | 2/2003 | Hargrave-Thomas | . | B25H 3/006 206/303 |
| 2004/0020806 A1 * | 2/2004 | German, III | .......... | B23D 47/00 206/349 |
| 2005/0042103 A1 | 2/2005 | Carillo et al. | | |
| 2007/0108087 A1 | 5/2007 | Leung | | |

FOREIGN PATENT DOCUMENTS

| | | |
|---|---|---|
| CN | 201617729 U | 11/2010 |
| DE | 202010008874 U1 | 1/2011 |
| FR | 2815838 A1 | 5/2002 |

OTHER PUBLICATIONS

International Patent Application No. PCT/CN2012000300 dated Mar. 9, 2012, Applicant: Whirlpool Corporation, entitled "Container and System for Holding a Cutting Tool of a Food Processing Device"; International Search Report, dated Dec. 13, 2012 re: same.
European Patent Application No. 12870454 filed, local filing Oct. 6, 2014, Applicant: Whirlpool Europe S.r.l., Extended European Search Report dated Oct. 26, 2015 re: same.

* cited by examiner

CONTAINER AND SYSTEM FOR HOLDING A CUTTING TOOL OF A FOOD PROCESSING DEVICE

TECHNICAL FIELD

The present disclosure relates generally to a domestic food processing device and, more particularly, to a container for carrying or holding a cutting tool of a domestic food processing device.

BACKGROUND

A food processing device is a motorized domestic appliance for manipulating (e.g., chopping, slicing, dicing, shredding, grating, or blending) food items. Such an appliance includes a bowl with a removable lid. Food items are inserted into the bowl through a feed tube formed in the lid where they are cut by motor-driven cutting tool and collected in the bottom of the bowl. Some food processors also include an outlet on the bowl that guides the processed food items into an outside bin, container, or other bowl.

Food processors typically come equipped with a number of interchangeable cutting tools for slicing, shredding, or other food processing operations. Between each use, the cutting tools may be cleaned by hand or in a dishwashing machine before being placed in a cabinet for storage.

SUMMARY

According to one aspect of the disclosure, a container for holding a cutting tool of a food processing device is disclosed. The container includes a shell defining a chamber sized to receive one of at least a first cutting tool and a second cutting tool. The shell has a first outer surface, a second outer surface positioned opposite the first outer surface, and a side wall extending between the first outer surface and the second outer surface. The shell has a first slot defined in the first outer surface, and a second slot defined in the second outer surface that is aligned with the first slot. The first slot receives a stem of the first cutting tool when the first cutting tool is positioned in the chamber, and the second slot receives a stem of the second cutting tool when the second cutting tool is positioned in the chamber. A plurality of openings are defined in the first outer surface. Each opening is arranged circumferentially around the first slot and is sized to permit fluid to pass into the chamber.

In some embodiments, the shell may have an access opening defined in a side thereof to permit one of at least the first cutting tool and the second cutting tool to be positioned in the chamber. In some embodiments, the shell may include a first inner wall that extends inwardly from the access opening to define the first slot and a second inner wall that extends inwardly from the access opening to define the second slot.

Additionally, in some embodiments, the container may further include a retaining door pivotally coupled to the shell. The retaining door may be moveable between a closed position in which the access opening is covered such that the one of at least the first cutting tool and the second cutting tool is retained in the chamber when positioned therein and an open position in which the access opening is uncovered to permit the one of at least the first cutting tool and the second cutting tool to be positioned in the chamber. In some embodiments, the retaining door may have a plurality of slots defined therein that permit fluid to pass into the chamber.

In some embodiments, the shell may include a mounting flange that extends outwardly from the first outer surface. The retaining door may include a first arm pivotally coupled to the mounting flange, a second arm spaced apart from the first arm such that the shell is positioned between the first arm and the second arm, and a connecting wall extending between the first arm and the second arm. The connecting wall may be positioned over the access opening when the retaining door is in the closed position.

In some embodiments, the container may further include a locking mechanism to secure the retaining door in the closed position. Additionally, in some embodiments, the locking mechanism may include a tab extending outwardly from the first outer surface and a groove defined in an inner surface of the first arm.

In some embodiments, the retaining door may include a first slot defined in the first arm that receives the stem of the first cutting tool when the first cutting tool is positioned in the chamber and the retaining door is in the closed position. The door may also include a second slot defined in the second arm that receives the stem of the second cutting tool when the second cutting tool is positioned in the chamber and the retaining door is in the closed position.

In some embodiments, each of the first inner wall of the shell and the first inner wall of the retaining door may include a first concave inner surface that is defined by a first radius, and each of the second inner wall of the shell and the second inner wall of the retaining door may include a second concave inner surface that is defined by a second radius. The second radius may have a magnitude that is less than the magnitude of the first radius.

In some embodiments, the radii of the concave inner surfaces defining the first slot and the second slot of the shell may have origins that lie along a first longitudinal axis. The radii of the concave inner surfaces defining the first slot and the second slot of the retaining door may have origins that lie along the first longitudinal axis when the retaining door is in the closed position and a second longitudinal axis when the retaining door is in the open position. The second longitudinal axis may extend parallel to the first longitudinal axis.

In some embodiments, the side wall of the shell may have an inner surface that extends inwardly from the access opening and defines a width of the chamber. The shell may have a substantially planar inner surface that extends inwardly from the access opening. The substantially planar inner surface may extend orthogonal to the inner surface of the side wall and define a length of the chamber that is greater than the width of the chamber.

In some embodiments, the shell may include a first piece including the first slot and a second piece removably coupled to the first piece. The second piece may include the second slot.

According to another aspect, the container includes a shell defining a chamber sized to receive one of at least a first cutting tool and a second cutting tool and a retaining door pivotally coupled to the shell. The shell has an access opening defined in a side thereof to permit one of at least the first cutting tool and the second cutting tool to be positioned in the chamber. The retaining door is moveable between a closed position in which the access opening is covered such that the one of at least the first cutting tool and the second cutting tool is retained in the chamber when positioned therein, and an open position in which the access opening is uncovered to permit the one of at least the first cutting tool and the second cutting tool to be positioned in the chamber. The shell and the retaining door cooperate to define an enclosure that receives a stem of the first cutting tool to locate the first cutting tool in the chamber when the first cutting tool is positioned therein. A plurality of openings are defined in the shell and the retaining door. Each opening is sized to permit fluid to pass into the chamber.

In some embodiments, the retaining door may include a first arm pivotally coupled to the shell, a second arm spaced apart from the first arm such that the shell is positioned between the first arm and the second arm, and a connecting wall extending between the first arm and the second arm. The connecting wall may be positioned over the access opening when the retaining door is in the closed position.

In some embodiments, the shell may include an outer surface having an opening defined therein and an inner wall extending inwardly from the opening to define a slot in the shell. The first arm of the retaining door may have an inner surface that faces the outer surface of the shell. The inner surface may have an opening defined therein and an inner wall extending from the opening to define a slot in the first arm. The slots of the shell and the first arm may cooperate to define the enclosure. The inner walls of the shell and the first arm may engage the stem of the first cutting tool when the first cutting tool is positioned in the chamber and the retaining door is in the closed position.

In some embodiments, the enclosure may be a first enclosure, and the shell and the retaining door may cooperate to define a second enclosure positioned opposite the first enclosure. The second enclosure may receive a stem of the second cutting tool to locate the second cutting tool in the chamber when the second cutting tool is positioned therein.

According to another aspect, a cutting tool system for a food processing device is disclosed. The tool system includes a plurality of cutting tools including a first cutting tool having a cutting edge and a stem, and a second cutting tool having a cutting edge, an upper stem, and a lower stem. The system also includes a perforated shell defining a chamber sized to receive one of the plurality of cutting tools. The shell has a first outer surface having a first slot defined therein, a second outer surface positioned opposite the first outer surface that has a second slot defined therein, and a side wall extending between the first outer surface and the second outer surface. When the first cutting tool is positioned in the chamber, the stem of the first cutting tool is positioned in the first slot to locate the cutting edge within the chamber. When the second cutting tool is positioned in the chamber, the upper stem of the second cutting tool is positioned in the first slot and the lower stem of the second cutting tool is positioned in the second slot to locate the cutting edge within the chamber.

In some embodiments, the system may include a retaining door pivotally coupled to the shell. The retaining door may be moveable between a closed position in which the access opening is covered such that the one of at least the first cutting tool and the second cutting tool is retained in the chamber when positioned therein and an open position in which the access opening is uncovered to permit the one of at least the first cutting tool and the second cutting tool to be positioned in the chamber.

In some embodiments, the system may include a third cutting tool including a cutting blade and a rotating disk configured to move relative to the cutting blade to define a gap therebetween. The system may also include an adjustment device configured to position the rotating disk relative to the cutting blade such that the gap defined between the cutting blade and the rotating disk has a maximum thickness.

BRIEF DESCRIPTION OF THE DRAWINGS

The detailed description particularly refers to the following figures, in which.

DETAILED DESCRIPTION OF THE DRAWINGS

Figure 1:
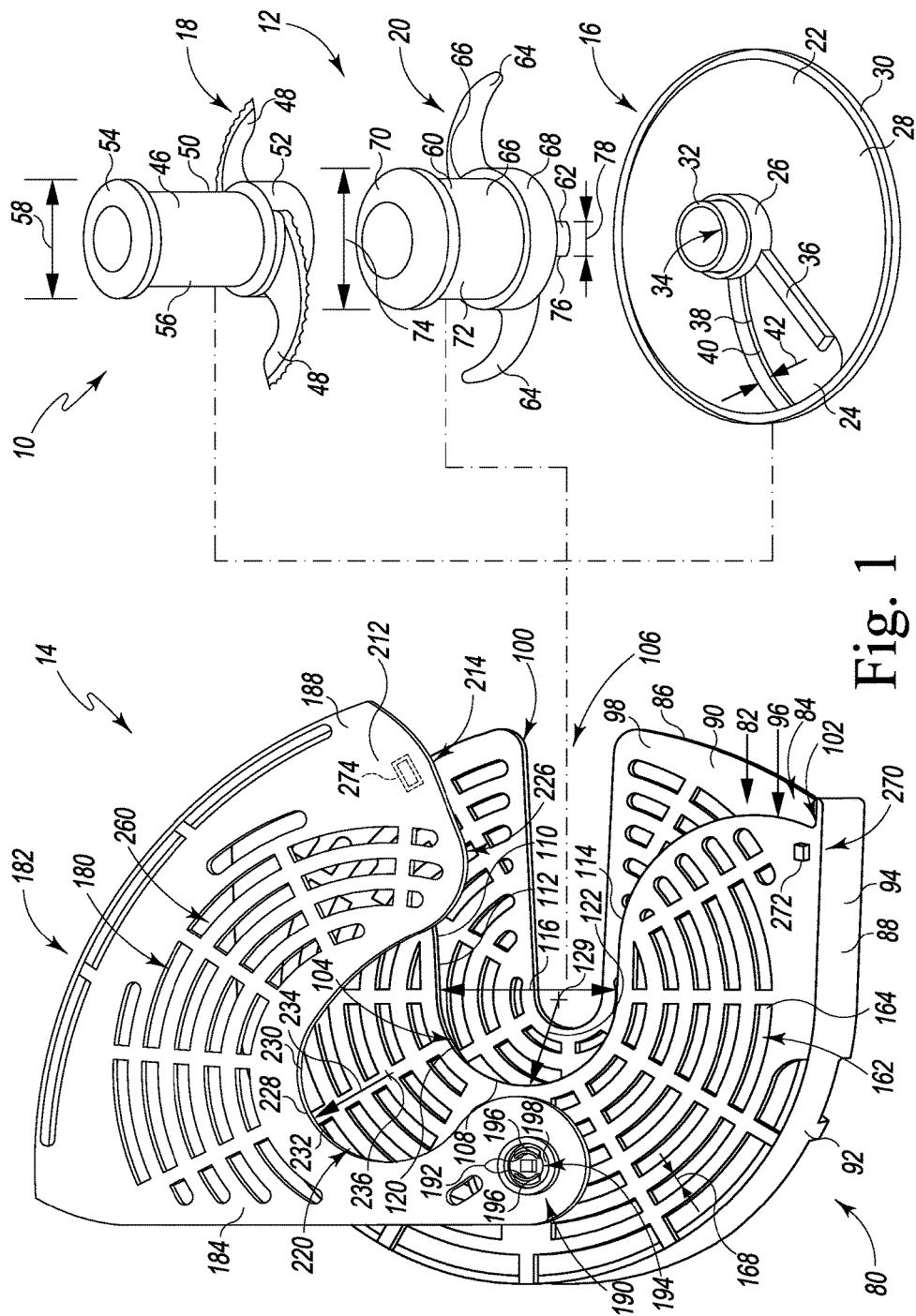
FIG. 1 is an exploded perspective view a cutting tool system including one embodiment of a cutting tool container and a plurality of cutting tools of a domestic food processing device.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

Referring now to FIG. 1, a cutting tool system 10 for a domestic food processing device is shown. One example of a food processor is the KitchenAid® 9-Cup Food Processor, Base Model No. KFP0922, which is commercially available from Whirlpool Corporation of Benton Harbor, Mich., U.S.A. The cutting tool system 10 includes a plurality of cutting tools 12 and a cutting tool container 14 configured to selectively carry or hold one of the cutting tools 12. The cutting tools 12 include an adjustable slicing assembly 16 and a pair of cutting blade units 18, 20. It should be appreciated that in other embodiments the cutting tools 12 may include other fixed or adjustable cutting attachments, such as, for example, a shedding disk, grate/shaving disk, julienne disk, and the like.

The adjustable slicing assembly 16 of the cutting tools 12 includes a rotating disk 22 and a blade assembly 24. The rotating disk 22 has a central hub 26, a planar body 28 extending radially outward from the central hub 26, and a rim 30 extending vertically from the outer perimeter of the planar body 28. The blade assembly 24 includes a stem 32 that is positioned in an aperture 34 defined in the central hub 26 of the rotating disk 22 and a mounting arm 36 that is secured to the stem 32. The mounting arm 36 extends radially outward from the stem 32 and has a cutting blade 38 secured thereto.

As shown in FIG. 1, the cutting blade 38 of the slicing assembly 16 has a cutting edge 40, and a gap 42 is defined between the cutting edge 40 of the blade assembly 24 and the planar body 28 of the rotating disk 22. The size of the gap 42 corresponds to the cutting thickness of the slicing assembly 16. The stem 32 of the blade assembly 24 and the central hub 26 of the rotating disk 22 are configured to slide relative to one another to increase or decrease the size of the gap 42, thereby changing the cutting thickness of slicing assembly 16.

The cutting blade unit 18 of the system 10 includes a stem 46 and a pair of cutting blades 48 that extend outwardly from the stem 46. The stem 46 has a body 50 that extends from an end 52 to an end 54. As shown in FIG. 1, the blades 48 of the cutting blade unit 18 are secured to the body 50 at the end 52. The body 50 has a cylindrical outer surface 56 between the ends 52, 54, and the cylindrical outer surface 56 has an outer diameter 58.

The other cutting blade unit 20 of the system 10 includes a stem 60, a stem 62 secured to the stem 60, and a pair of cutting blades 64 that extend outwardly from the stem 60. The stem 60 has a body 66 that extends from an end 68 to an end 70. As shown in FIG. 1, the blades 64 of the cutting blade unit 20 are secured to the body 66 at the end 68. The body 66 of the stem 60 has a cylindrical outer surface 72 between the ends 68, 70, and the cylindrical outer surface 72 has an outer diameter 74. The other stem 62 has a cylindrical body 76 that extends from the end 68 of the stem 60. The body 76 has an outer diameter 78, and, in the illustrative embodiment, the outer diameter 78 of the stem 62 is less than the outer diameter 74 of the stem 60.

As described above, the system 10 also includes a cutting tool container 14 configured to selectively carry or hold one of the cutting tools 12. The cutting tool container 14 includes a shell 80 that defines a chamber 82 sized to receive one of the cutting tools 12. As shown in FIG. 1, an access opening 84 is defined in a side 86 of the shell 80. As used herein, the term "access opening" is intended to mean the opening formed in the side of the shell through which a user may gain access to the chamber to, for example, insert and remove cutting tools from the same. In the illustrative embodiment, the access opening 84 is rectangular-shaped and is sized such that a user may insert or remove one of the cutting tools 12 from the chamber 82. It should be appreciated that in other embodiments the access opening 84 may be, for example, oblong-shaped or another geometric form sized to receive any of the cutting tools 12.

Figure 2:
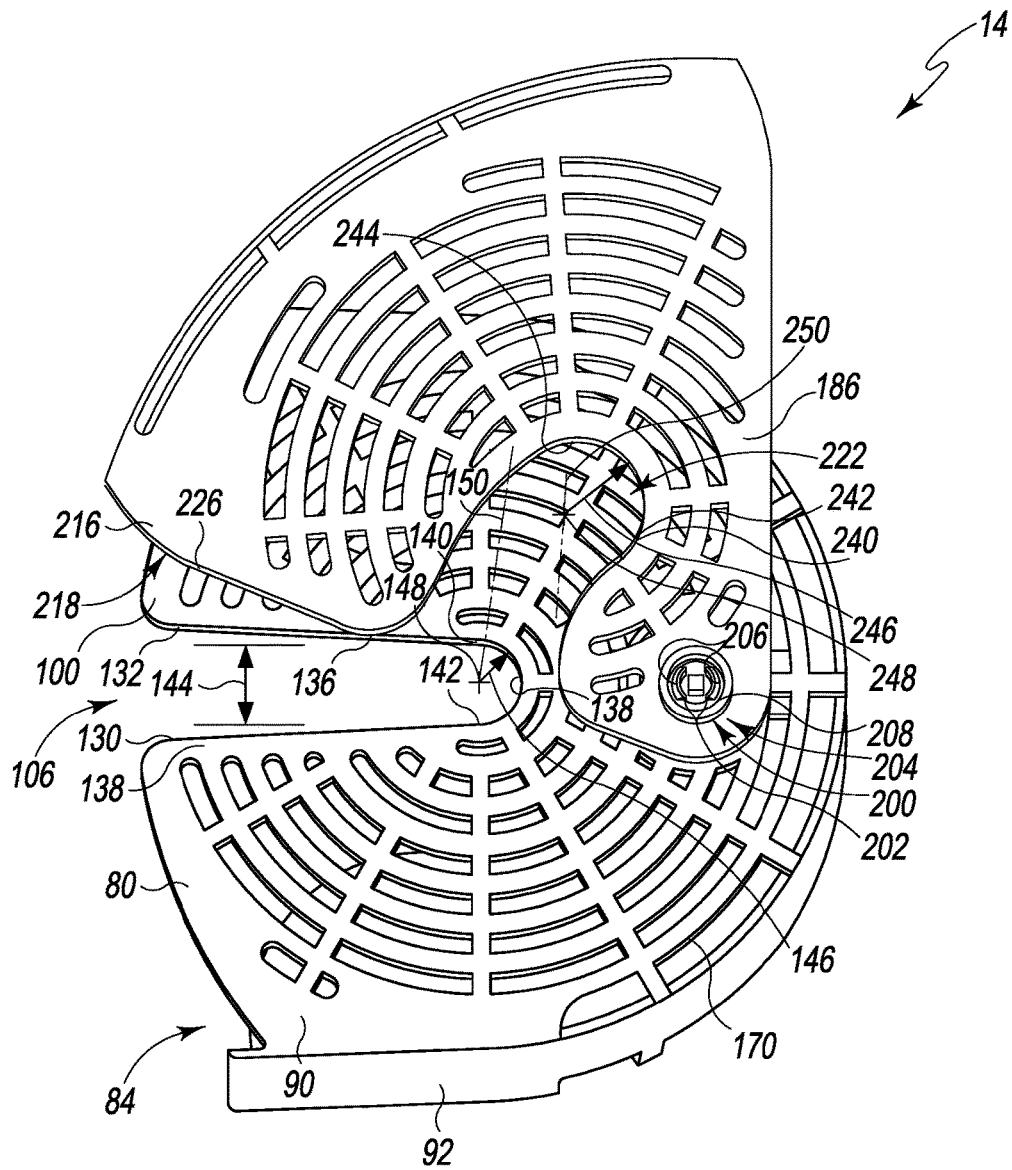
FIG. 2 is a perspective view of the container of FIG. 1 showing the opposite side of the container.

As shown in FIGS. 1 and 2, the shell 80 includes a side plate 88, a side plate 90 that is spaced apart from the side plate 90, and a side wall 92 that connects the side plates 88, 90. The side plate 88 has an external surface 94 and an internal surface 96 positioned opposite the external surface 94. The other side plate 90 has an internal surface 98 that faces the internal surface 96 of the side plate 88 and an external surface 100 that is positioned opposite the internal surface 98. In the illustrative embodiment, the surfaces 94, 96, 98, 100 of the side plates 88, 90 are substantially planar and extend parallel to each other. In other embodiments, one or more of the surfaces 94, 96, 98, 100 may be convex or concave.

Figure 4:
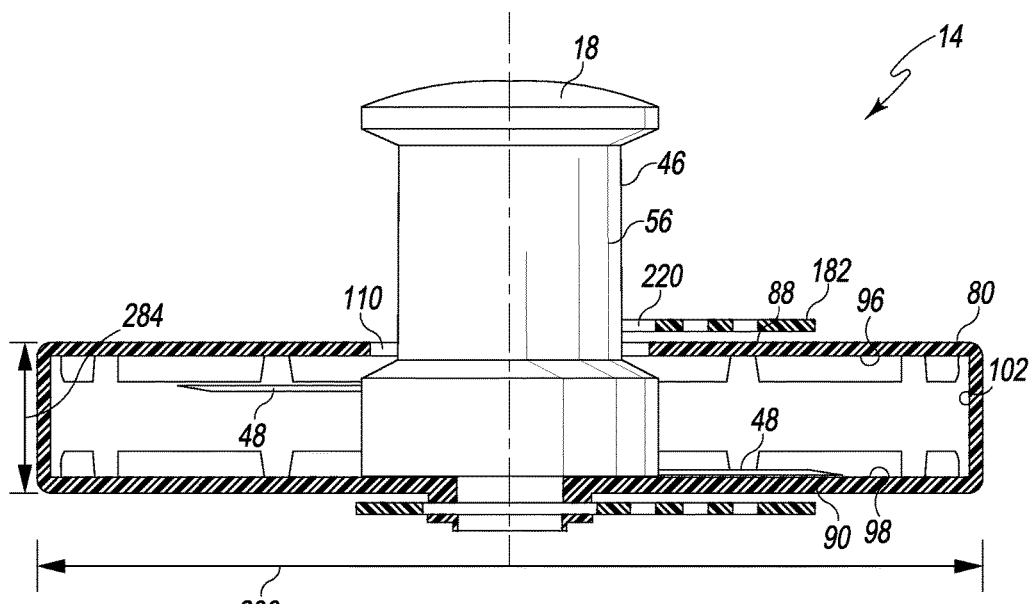
FIG. 4 is a cross-sectional side elevation view of the container of FIG. 1 with one of the cutting tools positioned therein.

The side wall 92 of the shell 80 has an internal surface 102 that extends between the internal surfaces 96, 98 of the side plates 88, 90. As shown in FIG. 1, the internal surfaces 96, 98, 102 extend inwardly from the access opening 84 defined in the side 86 of the shell 80. In the illustrative embodiment, the surfaces 96, 98, 102 cooperate to define the chamber 82 in the shell 80. As shown in FIG. 4, the surfaces 96, 98 extend orthogonal to the surface 102. Additionally, as shown in FIG. 4, the internal surface 102 of the side wall 92 defined a width 284 of the chamber 82 and the surfaces 96, 98 defined a length 286 of the chamber 82. In the illustrative embodiment, the length 286 is greater than the width 284 of the chamber.

Returning to FIG. 1, the shell 80 has a pair of slots 104, 106 defined therein that are connected to the access opening 84. As described in greater detail below, each of the slots 104, 106 is sized to receive a stem of a cutting tool 12 when the cutting tool 12 is positioned in the chamber 82. As shown in FIG. 1, the slot 104 is defined in the side plate 88. The external surface 94 of the side plate 88 has an opening 108 defined therein that extends from the middle of the shell 80 toward the side 86 of the shell 80, thereby connecting the opening 108 with the access opening 84. An inner wall 110 extends inwardly from the opening 108 and through the side plate 88 to define the slot 104 in the shell 80.

The inner wall 110 of the side plate 88 includes a planar surface 112 and a planar surface 114 that extends parallel to the planar surface 112. A width 116 of the slot 104 is defined between the surfaces 112, 114. In the illustrative embodiment, the magnitude of the width 116 is greater than the outer diameter 58 of the stem 46 of the cutting blade unit 18 such that the stem 46 may be received in the slot 104. Similarly, the magnitude of the width 116 is greater than the outer diameter 74 of the stem 60 of the cutting blade unit 20 such that the stem 60 may be received in the slot 104.

As shown in FIG. 1, the inner wall 110 of the side plate 88 also includes a concave surface 120 that connects the planar surface 112 to the planar surface 114. The concave surface 120 is defined by a radius 122 such that the slot 104 has a curved end, and the radius 122 has an origin 124 positioned in the middle of the slot 104. In the illustrative embodiment, the concave surface 120 is semi-circular such that the radius 122 has a magnitude that is equal to approximately half of the magnitude of the width 116 of the slot 104. It should be appreciated that in other embodiments the surface 120 may be substantially planar.

As shown in FIG. 2, the other slot 106 of the shell 80 is defined in the side plate 90. The external surface 100 of the side plate 90 has an opening 130 defined therein that extends from the middle of the shell 80 to the side 86 of the shell 80, thereby connecting the opening 130 to the access opening 84. An inner wall 132 extends inwardly from the opening 130 and through the side plate 90 to define the slot 106 in the shell 80.

The inner wall 132 of the side plate 90 includes a planar surface 134 and a planar surface 136 that define the sides of the slot 106. The inner wall 132 of the side plate 90 also includes a concave surface 138 that connects an edge 140 of the planar surface 134 with an edge 142 of the planar surface 136. As shown in FIG. 2, a width 144 of the slot 106 is defined between the edges 140, 142 of the surfaces 134, 138. In the illustrative embodiment, the magnitude of the width 144 is greater than the outer diameter 78 of the stem 62 of the cutting blade unit 20 such that the stem 62 of the cutting blade unit 20 may be received in the slot 106.

The concave surface 138 of the inner wall 132 is defined by a radius 146 such that the slot 106 has a curved end. As shown in FIG. 2, the radius 146 has an origin 148 that is positioned in the middle of the slot 106. In the illustrative embodiment, the concave surface 138 is semi-circular such that the radius 146 has a magnitude that is equal to half of the magnitude of the width 144 of the slot 106. It should be appreciated that in other embodiments the surface 138 may be substantially planar. As shown in FIG. 2, the origin 148 of the radius 146 of the slot 106 and the origin 124 of the radius 122 of the slot 104 define an axis 150 that extends through the centers of the slots 104, 106.

As shown in FIGS. 1 and 2, the shell 80 includes a plurality of openings 162 that extend through the side plates 88, 90 and the side wall 92. The openings 162 include a plurality of oblong openings 164 that extend between the external surface 94 and the internal surface 96 of the side plate 88. Each of the oblong openings 164 defines an arc and extends circumferentially around the slot 104. Each opening 164 is sized to permit the passage of fluid into the chamber 82 of the shell 80 and has a width 168 that is less than the width 116 of the slot 104. It should be appreciated that in other embodiments the width of each opening may vary such that no opening has the same width.

The openings 162 defined in the shell 80 also include a plurality of oblong openings 170 that extend between the external surface 100 and the internal surface 98 of the side plate 90. As shown in FIG. 2, each of the oblong openings 170 defines an arc and extends circumferentially around the slot 106. Each opening 170 is sized to permit the passage of fluid into the chamber 82 of the shell 80 and has a width 174 that is less than the width 144 of the slot 106.

In the illustrative embodiment, the shell 80 is formed as a single monolithic component from a molded polymeric material, such as, for example, nylon. It should be appreciated that in other embodiments the shell 80 may be from a metallic material such as, for example, steel. It should also be appreciated that in other embodiments the shell may be formed from multiple pieces that are later assembled.

As shown in FIG. 1, the tool container 14 also includes a retention device 180 configured to prevent the insertion or removal of a cutting tool 12 from the shell 80. In the illustrative embodiment, the retention device 180 is a retaining door 182 configured to be selectively positioned over the access opening 84 to prevent or permit a user from accessing the chamber 82 to insert or remove a cutting tool 12. It should be appreciated that in other embodiments the retention device 180 may take other forms, such as, for example, plugs, pins, latches, tabs, covers, and so forth that prevent the insertion or removal of a cutting tool 12.

The retaining door 182 of the container 14 includes a pair of arms 184, 186 that are pivotally coupled to the shell 80 and a connecting wall 188 that extends between the arms 184, 186. As shown in FIG. 1, the arm 184 is coupled to the side plate 88 via a pivot joint 190. The pivot joint 190 includes a pair of curved flanges 192 that extend outwardly from the external surface 94 of the plate 88. The flanges 192 are received in a through-hole 194 defined in the arm 184. Each flange 192 has a lip 196 configured to extend over the rim 198 of the through-hole 194, thereby securing the arm 184 to the plate 88.

As shown in FIG. 2, the shell 80 is positioned between the arms 184, 186 of the retaining door 182. The arm 186 is coupled to the side plate 90 via a pivot joint 200. The pivot joint 200, like the pivot joint 190, includes a pair of curved flanges 202 that extend outwardly from the external surface 100 of the plate 90. The flanges 202 are received in a through-hole 204 defined in the arm 186. Each flange 202 has a lip 206 configured to extend over the rim 208 of the through-hole 204, thereby securing the arm 186 to the plate 90. As described in greater detail below, retaining door 182 pivots about an axis 210 (see FIG. 3) defined by the pivot joints 190, 200 to move between an open position (see FIGS. 1 and 2) in which user-access to the chamber 82 through the access opening 84 is permitted and a closed position (see FIG. 3) in which user-access to the chamber 82 through the access opening 84 is prevented.

As shown in FIGS. 1 and 2, the arm 184 has an outer surface 212 and an inner surface 214 positioned opposite the outer surface 212. The inner surface 214 of the arm 184 faces the external surface 94 of the side plate 88. The other arm 186 has an outer surface 216 and an inner surface 218 positioned opposite the outer surface 216. The inner surface 218 of the arm 186 faces the external surface 100 of the side plate 90. In the illustrative embodiment, the surfaces 212, 214, 216, 218 of the arms 184, 186 are substantially planar and extend parallel to each other. In other embodiments, one or more of the surfaces 212, 214, 216, 218 may be convex or concave.

The retaining door 182 of the container 14 has a pair of slots 220, 222 defined therein that extend from a side 226 of the retaining door 182 and correspond to the slots 104, 106 defined in the shell 80. Like the slots 104, 106, each of the slots 220, 222 is sized to receive a stem of a cutting tool 12 when the cutting tool 12 is positioned in the chamber 82 and the retaining door 182 is in the closed position. As shown in FIG. 1, the slot 220 is defined in the arm 184. The arm 184 has an opening 228 that is defined in the outer surface 212 of the arm 184. The opening 228 extends from the side 226 of the door 182 toward the middle of the arm 184. An inner wall 230 extends inwardly from the opening 228 through the arm 184 to define the slot 220 in the retaining door 182.

The inner wall 230 of the arm 184 includes a concave surface 232 that is defined by a radius 234. The radius 234 has an origin 236 that is positioned in the middle of the slot 220. When the retaining door 182 is in the closed position shown in FIG. 3, the origin 236 is located on the axis 150 extending through the slots 104, 106 of the shell 80. In that way, the slot 220 is aligned with the slot 104 of the shell 80 when the retaining door 182 is in the closed position. In the illustrative embodiment, the magnitude of the radius 234 of the arm 184 is equal to the magnitude of the radius 122 of the side plate 88 such that the slot 220 has a width that is approximately equal to the width 116 of the slot 104. As such, the width of the slot 220 is greater than the outer diameter 58 of the stem 46 of the cutting blade unit 18 such that the stem 46 of the cutting blade unit 18 may be received in the slot 220. Similarly, the magnitude of the width is greater than the outer diameter 74 of the stem 60 of the cutting blade unit 20 such that the stem 46 of the cutting blade unit 20 may be received in the slot 220.

As shown in FIG. 2, the retaining door 182 also has a slot 222 defined in the other arm 186. The arm 186 of the retaining door 182 has an opening 240 that is defined in the outer surface 216 of the arm 186. The opening 240 extends from the side 226 of the door 182 toward the middle of the arm 186. An inner wall 242 extends inwardly from the opening 240 through the arm 186 to define the slot 222 in the retaining door 182.

The inner wall 242 of the arm 184 includes a concave surface 244 that is defined by a radius 246 such that the slot 222 has a curved end. As shown in FIG. 2, the radius 246 has an origin 248 that is positioned in the middle of the slot 222. When the door 182 is in the open position, the origins 236, 248 define an axis 250 that extends parallel to the axis 150 extending through the slots 104, 106 of the shell 80. When the retaining door 182 is in the closed position shown in FIG. 3, the origin 248 is located on the axis 150. In that way, the slot 222 is aligned with the slot 106 of the shell 80 when the retaining door 182 is in the closed position.

In the illustrative embodiment, the magnitude of the radius 246 of the arm 186 is equal to the magnitude of the radius 146 of the side plate 90, and the slot 222 has a width that is approximately equal to the width 144 of the slot 106. As such, the width of the slot 222 is greater than the outer diameter 78 of the stem 62 of the cutting blade unit 20 such that the stem 62 of the cutting blade unit 20 may be received in the slot 222.

As shown in FIGS. 1 and 2, the retaining door 182 includes a plurality of openings 260 that extend through the arms 184, 186 and the connecting wall 188. The openings 260 include a plurality of oblong openings 262 that extend between the outer surfaces 212, 216 and the internal surfaces 214, 218 of the arms 184, 186. Each of the oblong openings 260 defines an arc 264 and is sized to permit the passage of fluid.

The container 14 of the system 10 also includes a locking mechanism 270 operable to secure the retaining door 182 in the closed position. As shown in FIG. 2, the locking mechanism 270 includes a tab 272 extending outwardly from the external surface 94 of the side plate 80, and a groove 274 defined in the inner surface 214 of the arm 184. When the retaining door 182 is moved from the open position to the closed position, the tab 272 is advanced into the groove 274 via a snapping movement and is retained therein. To open the retaining door 182, a user may apply force to the arm 184 to remove the tab 272 from the groove 274. It should be appreciated that in other embodiments the locking mechanism may include any combination of latches, retainers, keys, and so forth. It should also be appreciated that the tab may extend from the side plate 90.

In use, any of the cutting tools 12 may be positioned in the container 14 for cleaning or storage. For example, a user may move the retaining door 182 into the open position shown in FIGS. 1 and 2 and advance the cutting blade unit 18 into the chamber 82 through the access opening 84. As the cutting blade unit 18 is advanced into the chamber 82, the stem 46 of the unit 18 is received in the slot 104 defined in the shell 80. The user may then close the retaining door 182 by pivoting the door 182 about the axis 210. As the door 182 closes, the stem 46 of the unit 18 is advanced into slot 220 of arm 184 of the retaining door 182, and the connecting wall 188 of the door 182 is positioned over the access opening 84 of the shell 80. As described above, the door 182 may be secured in the closed position by advancing the tab 272 of the locking mechanism 270 into the groove 274.

Figure 3:
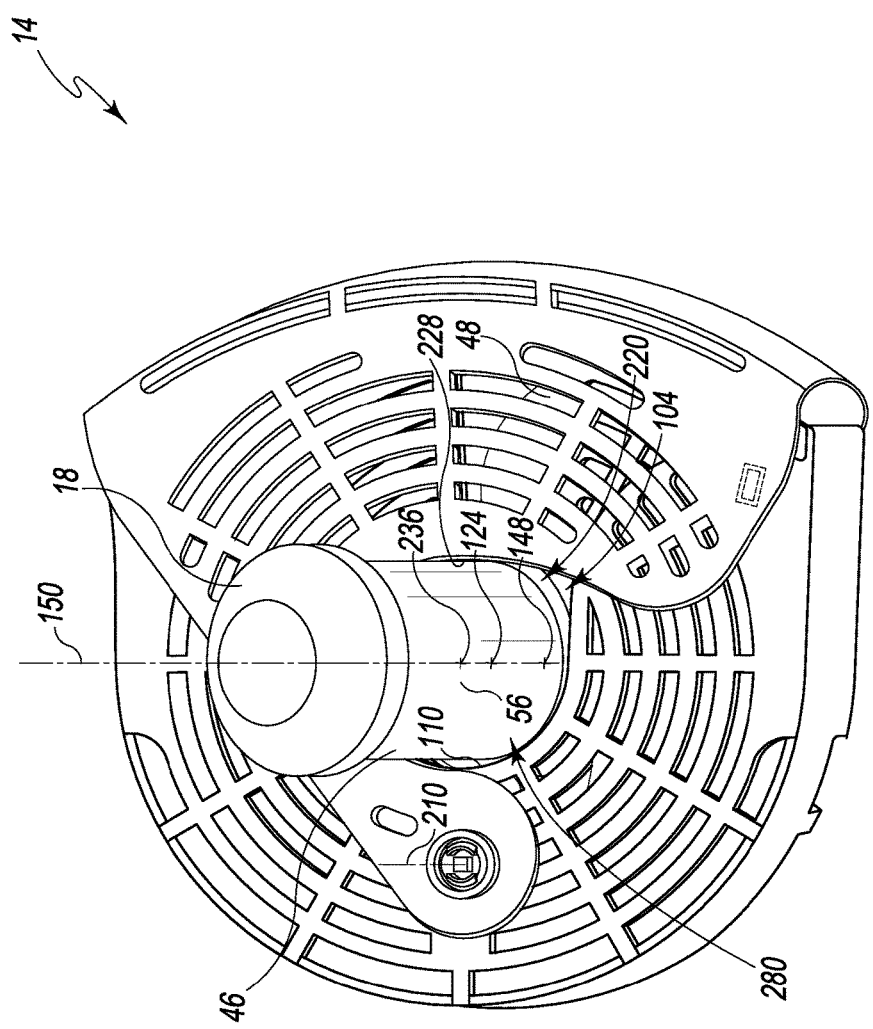
FIG. 3 is a perspective view of the container of FIG. 1 with one of the cutting tools positioned therein.

As shown in FIG. 3, the stem 46 of the cutting blade unit 18 is positioned in an enclosure 280 defined by the slot 104 of the shell 80 and the slot 220 of the retaining door 182. The inner walls 110, 230 that define the slots 104, 220 engage the cylindrical outer surface 56 of the stem 46 to locate and position the cutting blades 48 of the unit 18 within the chamber 82. As shown in FIG. 4, the cutting blades 48 of the unit 18 are located within the chamber 82 such that the blades 48 are spaced from the openings 162 defined in the shell 80. With the cutting blade unit 18 secured in the container 14, the container 14 may be placed in a dishwashing machine such that the cutting blade unit 18 may be cleaned after use. Additionally, the container 14 with the cutting blade unit 18 may be placed into a cabinet or drawer for storage between uses.

As described above, the container 14 may also be used with the other cutting blade unit 20. To do so, the cutting blade unit 20 may be advanced into the chamber 82 through the access opening 84 when the retaining door 182 is open. As the cutting blade unit 20 is advanced into the chamber 82, the stem 60 of the unit 20 is received in the slot 104 defined in the shell 80 and the stem 62 is received in the slot 106. The user may then close the retaining door 182. As the door 182 closes, the stem 60 of the unit 18 is advanced into the slot 220 of arm 184 of the retaining door 182, and the stem 62 of the unit 20 is advanced into the slot 222 of the arm 186. When the connecting wall 188 of the door 182 is positioned over the access opening 84 of the shell 80, the door 182 is in the closed position and the tab 272 of the locking mechanism 270 is positioned in the groove 274.

Figure 5:
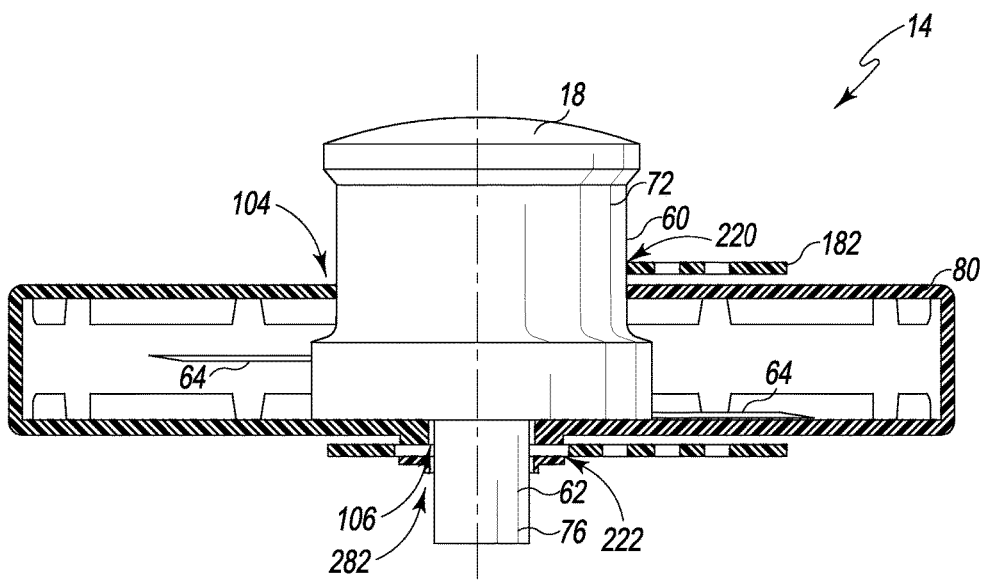
FIG. 5 is a cross-sectional side elevation view of the container of FIG. 1 with another of the cutting tools positioned therein.

The stem 60 of the cutting blade unit 20 is positioned in the enclosure 280, and the stem 62 of the unit 20 is positioned in an enclosure 282 defined by the slots 106, 222. The inner walls 110, 230 that define the slots 104, 220 engage the cylindrical outer surface 72 of the stem 60 and the inner walls 132, 230 that define the slots 106, 222 engage the cylindrical body 76 to locate and position the cutting blades 64 of the unit 20 within the chamber 82. As shown in FIG. 5, the cutting blades 64 of the unit 20 are located within the chamber 82 such that the blades 64 are spaced from the openings 162 defined in the shell 80. With the cutting blade unit 20 secured in the container 14, the container 14 may be placed in a dishwashing machine such that the cutting blade unit 20 may be cleaned after use. Additionally, the container 14 with the cutting blade unit 20 may be placed into a cabinet or drawer for storage between uses.

Figure 6:
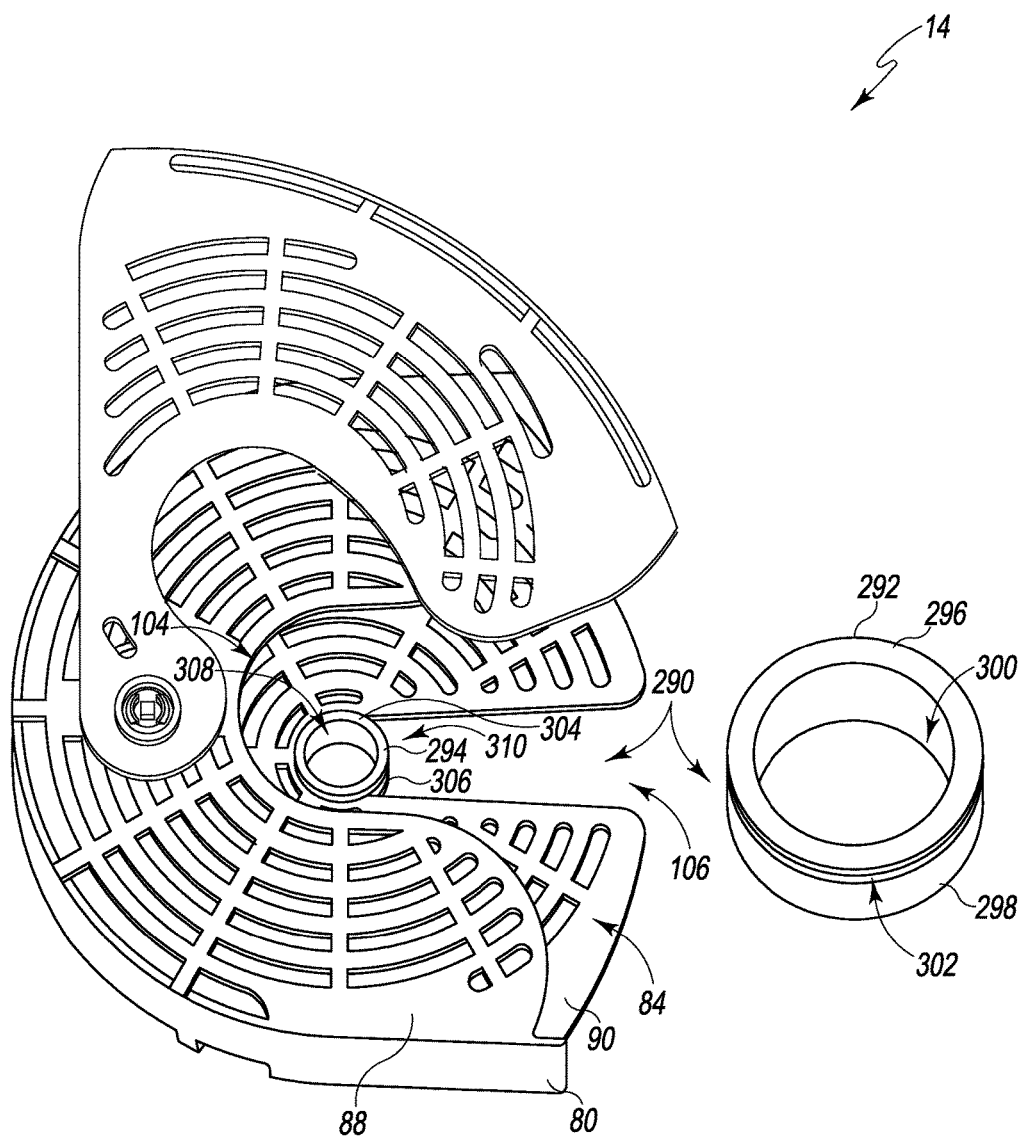
FIG. 6 is a perspective of the container of FIG. 1 and an adjustment device.

Referring now to FIG. 6, the container 14 of the system 10 is shown with an adjustment device 290 configured to engage the adjustable slicing assembly 16 to position the slicing assembly 16 in the chamber 82 and position the cutting blade 38 relative to the rotating disk 22 to provide maximum clearance therebetween. In the illustrative embodiment, the adjustment device 290 includes a pair of collars 292, 294 configured to engage the side plates 88, 90, respectively, of the shell 80. The collar 292 includes a body 296 having a cylindrical outer surface 298 and a cylindrical passageway 300 defined therein. A channel 302 is defined in the outer surface 298 of the collar 292, and the channel 302 is sized to receive the inner wall 110 defining the slot 104 of the shell 80.

The collar 294 of the adjustment device 290 includes a body 304 having a cylindrical passageway 308 defined therein. The body 304 includes a cylindrical outer surface 306, and a channel 310 is defined in the outer surface 306 of the collar 294. The channel 310 is sized to receive the inner wall 132 defining the slot 106 of the shell 80.

Figure 7:
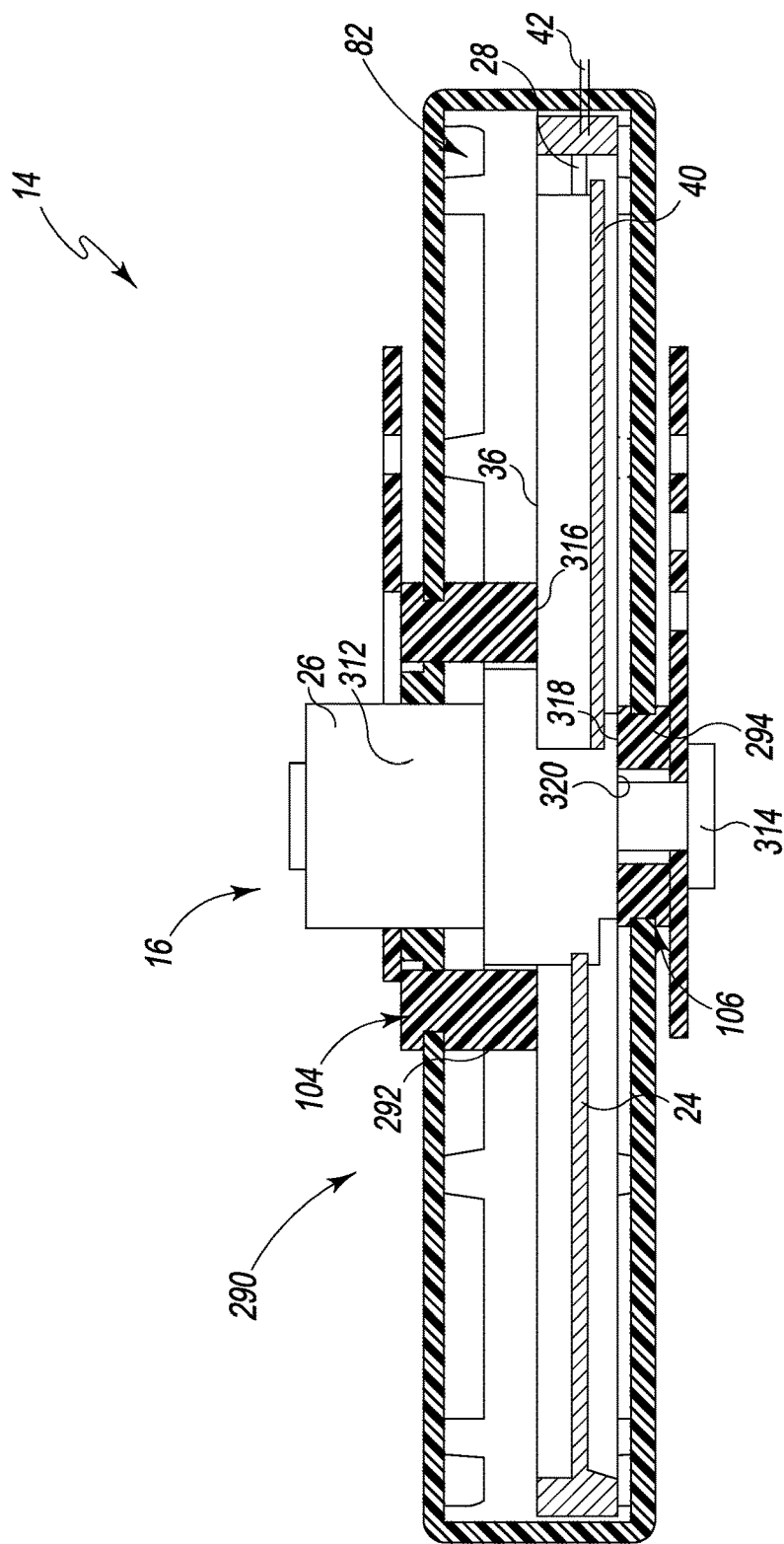
FIG. 7 is a cross-sectional side elevation view of the container of FIG. 1 including the device of FIG. 6 and another of the cutting tools positioned in the chamber of the container.

As described above, the adjustment device 290 engages the rotating disk 22 and the blade assembly 24 of the adjustable slicing assembly 16 to position the slicing assembly 16 in the chamber 82. To do so, the collar 292 of the adjustment device 290 is positioned over a lower end 312 of the central hub 26 of the rotating disk 22, and the other collar 294 is positioned over the tip 314 of the stem 32 of the blade assembly 24, as shown in FIG. 7. The adjustable slicing assembly 16 may be advanced through the access opening 84 into the chamber 82. As the assembly 16 enters the chamber 82, the collars 292, 294 may be advanced into the slots 104, 106 of the shell 80.

To align the channel 302 of the collar 292 with the slot 104, the user may move the collar 292 along the central hub 26 to engage a lower surface 316 of the collar 292 with the mounting arm 36 of the blade assembly 24. Similarly, the collar 294 may be moved along the stem 32 of the blade assembly 24 to engage an upper surface 318 of the collar 294 with the upper end 320 of the central hub 26 and align the channel 310 with the slot 106. After the collars 292, 294 are aligned with the slots 104, 106, respectively, the collars 292, 294 may be advanced into the slots 104, 106 such that the inner walls 110, 132 are received in the channels 302, 310.

As shown in FIG. 7, the engagement between the collar 292 and the mounting arm 36 and the engagement between the collar 294 and the central hub 26 adjusts the gap 42 defined between the cutting edge 40 of the blade assembly 24 and the planar body 28 of the rotating disk 22. In the illustrative embodiment, the gap 42 is adjusted to a maximum thickness, thereby providing the greatest amount of clearance between the cutting edge 40 and the planar body 28 when the adjustable slicing assembly 16 is positioned in the container 14. After the slicing assembly 16 is positioned in the chamber 82, the retaining door 182 may be closed as described above to secure the slicing assembly 16 in the container 14. With the slicing assembly 16 secured in the container 14, the container 14 may be placed in a dishwashing machine such that the slicing assembly 16 may be cleaned after use. Additionally, the container 14 with the slicing assembly 16 may be placed into a cabinet or drawer for storage between uses.

It should be appreciated that in other embodiments the adjustment device 290 may take other forms. For example, the adjustment device might include only a single collar. In other embodiments, the adjustment device may include a number of wedges, ramps, projections, or other structures that are integrated into the shell and engage the slicing assembly to position the cutting blade relative to the rotating disk.

Figures 8, 9:
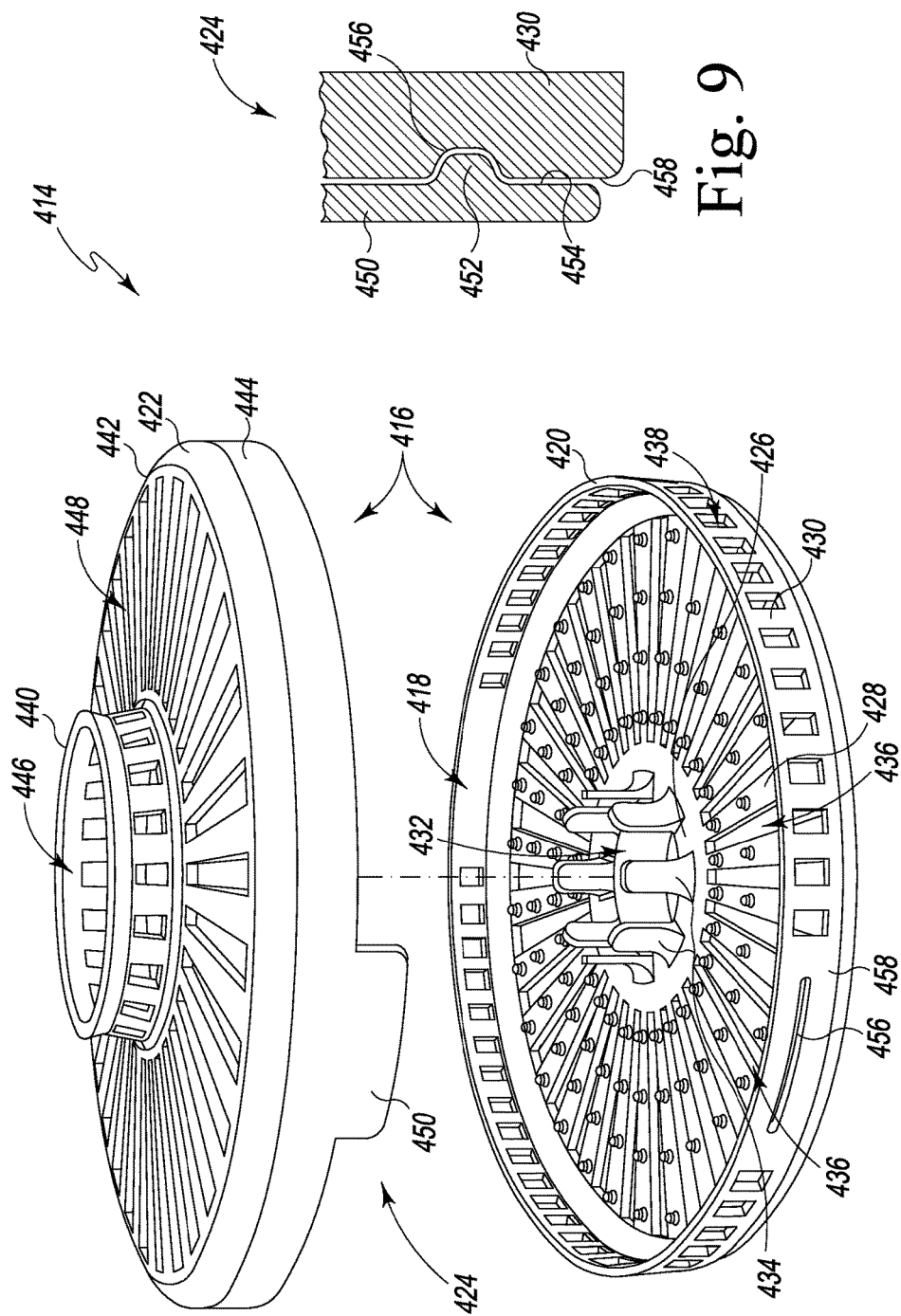
FIG. 8 is an exploded perspective view of another embodiment of a container.
FIG. 9 is a fragmentary cross-sectional side elevation view of the container of FIG. 8.

Referring now to FIG. 8, another embodiment of a tool container (hereinafter container 414) is shown. The container 414 includes a shell 416 that defines a chamber 418 sized to receive one of the cutting tools 12. The shell 416 has a base 420 and a top 422 that are configured to be coupled together via a locking mechanism 424.

The base 420 of the shell 416 has a hub 426, a body 428 extending radially outward from the hub 426, and a rim 430 that extends vertically from the outer perimeter of the body 428. The hub 426 has a cylindrical slot 432 defined therein that is sized to receive, for example, the stem 62 of the cutting blade unit 20. A plurality of alignment tabs 434 extend upwardly from the hub 426. The tabs 434 are configured to engage, for example, the stem 60 of the cutting blade unit 20 to locate and position the cutting blade unit 20 within the chamber 418.

The body 428 of the base 420 has a plurality of openings 436 defined therein. Each opening 436 extends radially outward from the hub 426 to the rim 430. The openings 436 are sized to permit the passage of fluid into the chamber 418 of the shell 416. In the illustrative embodiment, each opening 436 has a trapezoidal shape. In other embodiments, the openings 436 may be circular, triangular, or other geometric shape. It should be appreciated that in other embodiments the openings 436 may vary in size. The rim 430, like the body 428, has a plurality of openings 438 defined therein that are sized to permit the passage of fluid into the chamber 418 of the shell 416.

The top 422 of the shell 416 has a hub 440, a body 442 extending radially outward from the hub 440, and a rim 444 that extends vertically from the outer perimeter of the body 442. The hub 440 has a cylindrical slot 446 defined therein that is sized to separately receive, for example, the stem 46 of the cutting blade unit 18 and the stem 60 of the cutting blade unit 20. As shown in FIG. 8, the body 442 of the top 422 has a plurality of openings 448 defined therein. Each opening 448 extends radially outward from the hub 440 to the rim 444. The openings 448 are sized to permit the passage of fluid into the chamber 418 of the shell 416. In the illustrative embodiment, each opening 448 has a trapezoidal shape. In other embodiments, the openings 448 may be circular, triangular, or other geometric shape. It should be appreciated that in other embodiments the openings 448 may vary in size.

As described above, the container 414 includes a locking mechanism 424 configured to secure the base 420 to the top 422. As shown in FIGS. 8 and 9, the locking mechanism 424 includes a flange 450 that extends downwardly from the rim 444. The flange 450 has a tab 452 extending inwardly from an inner surface 454 thereof. The tab 452 is configured to be received in a groove 456 defined in an outer surface 458 of the rim 430 of the base 420, thereby securing the base 420 to the top 422.

In other embodiments, the base 420 may include a tab that is received in a groove. It should be appreciated that in other embodiments the locking mechanism may include any combination of latches, retainers, keys, and so forth necessary to secure the base 420 to the top 422. In still other embodiments, the top of the shell may be formed from two parts that are hinged to the base of the shell.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure.

The invention claimed is:

1. A container for holding a cutting tool of a food processing device, the container comprising:
   a shell comprising:
      a first side plate,
      a second side plate positioned opposite and facing the first side plate,
      a side wall extending between the first side plate and the second side plate,
      a mounting flange that extends outwardly from an external surface of the first side plate,
      the first side plate, the second side plate, and the side wall defining a chamber configured to receive one of at least a first cutting tool and a second cutting tool,
      wherein the shell has (i) a first slot defined in the first side plate, the first slot configured to receive a stem of the first cutting tool when the first cutting tool is positioned in the chamber, (ii) a second slot defined in the second side plate that is aligned with the first slot, the second slot configured to receive a stem of the second cutting tool when the second cutting tool is positioned in the chamber, and (iii) a plurality of openings defined in the first side plate, each opening being arranged circumferentially around the first slot and being sized to permit fluid to pass into the chamber;
   a retaining door comprising:
      a first arm pivotally coupled to the mounting flange;
      a second arm spaced apart from the first arm such that the shell is positioned between the first arm and the second arm;
      a connecting wall extending between the first arm and the second arm;

an open position configured to permit insertion of one of at least the first cutting tool and the second cutting tool into the chamber of the shell;

a closed position such that the connecting wall is positioned to prevent removal of the first cutting tool or the second cutting tool inserted into the chamber of the shell; and an inner surface facing at least a portion of the first side plate defining the chamber when the retaining door is in the closed position.

2. The container of claim 1, wherein the shell has an access opening defined in a side thereof configured to permit one of at least the first cutting tool and the second cutting tool to be positioned in the chamber.

3. The container of claim 2, wherein the shell includes (i) a first inner wall that extends inwardly from the access opening to define the first slot, and (ii) a second inner wall that extends inwardly from the access opening to define the second slot.

4. The container of claim 3, wherein the retaining door is moveable between (i) the closed position in which the access opening is covered and (ii) the open position in which the access opening is uncovered.

5. The container of claim 4, wherein the retaining door has a plurality of openings defined therein that permit fluid to pass into the chamber.

6. The container of claim 3, wherein:

each of the first inner wall of the shell and the first inner wall of the retaining door includes a first concave inner surface that is defined by a first radius, and each of the second inner wall of the shell and the second inner wall of the retaining door includes a second concave inner surface that is defined by a second radius, the second radius having a magnitude that is less than the magnitude of the first radius.

7. The container of claim 6, wherein:

the radii of the concave inner surfaces defining the first slot and the second slot of the shell have origins that lie along a first longitudinal axis, and the radii of the concave inner surfaces defining the first slot and the second slot of the retaining door have origins that lie along (i) the first longitudinal axis when the retaining door is in the closed position, and (ii) a second longitudinal axis when the retaining door is in the open position, the second longitudinal axis extending parallel to the first longitudinal axis.

8. The container of claim 3, wherein the side wall of the shell has an inner surface that extends inwardly from the access opening and defines a width of the chamber, and the shell has a substantially planar inner surface that extends inwardly from the access opening, the substantially planar inner surface extending orthogonal to the inner surface of the side wall and defining a length of the chamber that is greater than the width of the chamber.

9. The container of claim 1, further comprising a locking mechanism to secure the retaining door in the closed position.

10. The container of claim 9, wherein the locking mechanism includes a tab extending outwardly from the external surface of the first side plate and a groove defined in an inner surface of the first arm.

11. The container of claim 1, wherein the retaining door further includes:

a first slot defined in the first arm, the first slot configured to receive the stem of the first cutting tool when the first cutting tool is positioned in the chamber and the retaining door is in the closed position, and a second slot defined in the second arm, the second slot configured to receive the stem of the second cutting tool when the second cutting tool is positioned in the chamber and the retaining door is in the closed position.

12. The container of claim 1, wherein the shell includes a first piece including the first slot, and a second piece removably coupled to the first piece, the second piece including the second slot.

13. A container for holding a cutting tool of a food processing device, the container comprising:

a shell defining a chamber configured to receive one of at least a first cutting tool and a second cutting tool, the shell having (i) an access opening defined in a side thereof configured to permit one of at least the first cutting tool and the second cutting tool to be positioned in the chamber, and (ii) a mounting flange that extends outwardly from an external surface thereof, and a retaining door including (i) a first arm pivotally coupled to the mounting flange of the shell, (ii) a second arm spaced apart from the first arm such that the shell is positioned between the first arm and the second arm, and (iii) a connecting wall extending between the first arm and the second arm;

the retaining door being moveable between (i) a closed position in which the connecting wall of the retaining door is positioned over the access opening such that the one of at least the first cutting tool and the second cutting tool is retained in the chamber when positioned therein and in which at least a portion of the external surface of the shell is disposed between the chamber and the retaining door, and (ii) an open position in which the access opening is uncovered to permit the one of at least the first cutting tool and the second cutting tool to be positioned in the chamber, wherein (i) the shell and the retaining door cooperate to define an enclosure that is configured to receive a stem of the first cutting tool to locate the first cutting tool in the chamber when the first cutting tool is positioned therein, and (ii) a plurality of openings are defined in the shell and the retaining door, each opening being sized to permit fluid to pass into the chamber.

14. The container of claim 13, wherein:

the external surface of the shell has an opening defined therein and the shell further includes an inner wall extending inwardly from the opening to define a slot in the shell, the first arm of the retaining door has an inner surface that faces the external surface of the shell, the inner surface having an opening defined therein and an inner wall extending from the opening to define a slot in the first arm, and the slots of the shell and the first arm cooperate to define the enclosure and the inner walls of the shell and the first arm are configured to engage the stem of the first cutting tool when the first cutting tool is positioned in the chamber and the retaining door is in the closed position.

15. The container of claim 13, wherein (i) the enclosure is a first enclosure, and (ii) the shell and the retaining door cooperate to define a second enclosure positioned opposite the first enclosure, the second enclosure configured to receive a stem of the second cutting tool to locate the second cutting tool in the chamber when the second cutting tool is positioned therein.

16. A cutting tool system for a food processing device, comprising:

a plurality of cutting tools including (i) a first cutting tool having a cutting edge and a stem, and (ii) a second cutting tool having a cutting edge, an upper stem, and a lower stem, and a perforated shell defining a chamber sized to receive one of the plurality of cutting tools, the perforated shell comprising (i) a first outer surface having a first slot defined therein, (ii) a second outer surface positioned opposite the first outer surface, the second outer surface having a second slot defined therein, and (iii) a side wall extending between the first outer surface and the second outer surface, wherein (i) when the first cutting tool is positioned in the chamber, the stem of the first cutting tool is positioned in the first slot to locate the cutting edge within the chamber, and (ii) when the second cutting tool is positioned in the chamber, the upper stem of the second cutting tool is positioned in the first slot and the lower stem of the second cutting tool is positioned in the second slot to locate the cutting edge within the chamber.

17. The cutting tool system of claim 16, further comprising a retaining door pivotally coupled to the perforated shell, the retaining door being moveable between (i) a closed position in which an access opening is covered such that the one of at least the first cutting tool and the second cutting tool is retained in the chamber when positioned therein, and (ii) an open position in which the access opening is uncovered to permit the one of at least the first cutting tool and the second cutting tool to be positioned in the chamber.

18. The cutting tool system of claim 16, further comprising:

a third cutting tool including a cutting blade and a rotating disk configured to move relative to the cutting blade to define a gap therebetween, and an adjustment device configured to position the rotating disk relative to the cutting blade such that the gap defined between the cutting blade and the rotating disk has a maximum thickness.

* * * * *